United States Patent [19]
Becker et al.

[11] Patent Number: 6,072,869
[45] Date of Patent: Jun. 6, 2000

[54] ADAPTIVE METHOD AND APPARATUS FOR DETECTING A STUTTER DIAL TONE SIGNAL

[75] Inventors: Christopher Henry Becker; Joseph Chi Tak Chan, both of Calgary, Canada

[73] Assignee: Nortel Networks Corporation, Montreal, Canada

[21] Appl. No.: 08/996,146

[22] Filed: Dec. 22, 1997

[51] Int. Cl.[7] .................................................. H04M 3/00
[52] U.S. Cl. ........................ 379/386; 379/372; 379/350
[58] Field of Search .............................. 379/372, 88.12, 379/386, 377

[56] References Cited

U.S. PATENT DOCUMENTS

| | | |
|---|---|---|
| 4,061,885 | 12/1977 | Nash et al. .............................. 341/118 |
| 4,405,833 | 9/1983 | Cave et al. ................................. 379/34 |
| 4,539,646 | 9/1985 | Stein et al. ................................ 364/484 |
| 4,539,692 | 9/1985 | Munter ....................................... 375/98 |
| 5,327,493 | 7/1994 | Richmond et al. ..................... 379/372 |
| 5,483,593 | 1/1996 | Gupta et al. ............................ 379/386 |
| 5,521,964 | 5/1996 | Schull et al. ............................. 379/67 |
| 5,563,942 | 10/1996 | Tulai ....................................... 379/351 |

*Primary Examiner*—Forester W. Isen
*Assistant Examiner*—Brian Tyrone Pendleton
*Attorney, Agent, or Firm*—Kevin L. Smith

[57] ABSTRACT

A method and apparatus for detecting a stutter dial tone SDT signal. The method includes the steps of, receiving a received signal from a subscriber loop, generating a signal envelope of the received signal, generating a threshold parameter value from the signal envelope, counting the number of threshold parameter crossings undertaken by the signal envelope and producing a signal indicating SDT signal has been received when number of threshold crossings exceeds a predefined value.

56 Claims, 10 Drawing Sheets

FIGURE 1

| Read Only Memory | |
|---|---|
| *** | |
| SDT Detection Program | |
| Adapt Threshold Routine | |
| Test For SDT Signal Routine | |
| Test for Upward Crossing Subroutine | |
| Test for Downward Crossing Subroutine | |
| Current_Time() Function | |
| *** | |
| MIN_DIF | [INTEGER] |
| MAX_SAMPLE_DURATION | [TIME] |
| MIN_SPECIFIED_CROSSINGS | [INTEGER] |
| MIN_PULSE | [TIME] |

| Random Access Memory | | |
|---|---|---|
| Max.Val | [Integer 0 - 255] | 48 |
| Min.Val | [Integer 0 - 255] | 50 |
| ADC.Val | [Integer 0 - 255] | 52 |
| Threshold | [Integer 0 - 255] | 54 |
| Sample1 | [Integer 0 - 255] | 56 |
| Sample2 | [Integer 0 - 255] | 58 |
| Sample.Start | [Time] | 60 |
| This.Time | [Time] | 62 |
| Last.Time | [Time] | 64 |
| Measured.Crossings | [Integer 0 - 255] | 66 |
| Max.Pulse | [Time] | 68 |
| Last.Cross | Flag [UP/DOWN/NULL] | 70 |
| SDT | Flag [TRUE/FALSE} | 72 |

Figure 3

SDT DETECTION PROGRAM

ADAPTIVE METHOD AND APPARATUS FOR DETECTING A STUTTER DIAL TONE SIGNAL

FIELD OF THE INVENTION

This invention is directed to adaptive methods and devices for detecting a stutter dial tone signal on a telephone line.

BACKGROUND OF THE INVENTION

Many telephone company central offices (CO) transmit a stutter dial tone (SDT) signal on a telephone line to indicate to customer premises equipment (CPE) that a particular condition exists. For example, an SDT signal is used to indicate that a voice message exists in a voice mailbox associated with the telephone line.

In an industry as highly standardized as the telephone industry, the specification for the SDT signal is quite loose and it can be difficult build a device that will detect all SDT signals used throughout the United States, or more widely. An SDT signal is defined by the American National Standards Institute (ANSI) to be a periodic signal having component frequencies of 350 Hz and 440 Hz and which is alternately applied for no less than 100 ms and then suppressed for no less than 100 ms. Frequencies and pulsing durations vary widely within these specifications, and therefore any device for detecting an SDT signal must be both broadly tolerant and yet sufficiently discriminating. Such detection devices are generally tested under a wide range of conditions during their design phases so that the appropriate parameters can be selected empirically to reach the best practical compromise.

Conventionally, robustly detecting an SDT signal has proven difficult. Generally, detection has been done by estimating the electrical energy on the telephone line by measuring the envelope of either the line current or voltage and comparing the result to an expected value. The envelope, rather than the raw line current or voltage, is measured because an SDT signal is an AC signal. Moreover, the DC level of the line current or voltage changes when more than one CPE samples a telephone line in search of an SDT signal.

Detecting an SDT signal presents two main challenges. Firstly, one must detect signal transitions, that is, whether the signal has crossed a threshold from an off-state to an on-state or an on-state to an off-state. Secondly, one must determine whether a detected threshold crossing is a component of an SDT signal or noise.

As previously mentioned, detector parameters such as the threshold level are conventionally selected as an empirical compromise after much experimentation. However, such predetermined compromises will not likely be optimal for any particular line condition or SDT signal. What would be desirable is a method for detecting an SDT signal wherein the detection parameters are adapted to the particular characteristics of the relevant telephone line and the relevant SDT signal being sought.

SUMMARY OF THE INVENTION

In accordance with one aspect of the invention, there is provided a method of detecting a stutter dial tone SDT signal. The method includes the steps of:
a) receiving a received signal from a subscriber loop;
b) generating a signal envelope of the received signal;
c) generating a threshold parameter value from the signal envelope;
d) counting the number of threshold parameter crossings undertaken by the signal envelope; and
e) producing a signal indicating said SDT signal has been received when said number of threshold crossings exceeds a predefined value.

Preferably, the method includes the step of producing a signal indicating the SDT signal has been received when the number of threshold crossings exceeds a predefined value.

Preferably, the method includes the step of taking samples of the signal envelope.

Preferably, the method includes the step of determining maximum and minimum values of at least some of the samples.

Preferably, the method includes the step of generating the threshold parameter value as the scaled sum of the minimum and maximum values.

Preferably, the method includes the step of determining whether or not a difference between the maximum value and the minimum value exceeds a predefined value.

Preferably, the method includes the step of taking the samples while the difference is less than a predefined value.

Preferably, the method includes the step of generating the threshold parameter value as the scaled sum of the minimum and maximum values.

Preferably, the method includes the step of determining whether or not the signal envelope crosses the predefined threshold in a first direction or a second direction opposite to the first direction.

Preferably, the method includes the step of recording the times at which each crossing occurs.

Preferably, the method includes the step of determining the time elapsed between successive crossings.

Preferably, the method includes the step of determining whether or not the time elapsed exceeds a predefined value.

Preferably, the method includes the step of increasing the predefined value when the time elapsed exceeds the predefined value.

Preferably, the method includes the step of determining the maximum time between successive threshold crossings in at least one of the directions, the maximum time representing a maximum pulse width.

Preferably, the method includes the step of determining the number of maximum width pulses which can occur in a predefined sampling duration.

Preferably, the method includes the step of determining the number of maximum pulse width pulses includes the step of taking the quotient of a predefined sampling duration and the maximum pulse width.

Preferably, the method includes the step of producing the signal indicating the SDT signal has been received when the number of threshold crossings exceeds the quotient.

In accordance with another aspect of the invention, there is provided a method of signalling a telephone in communication with a subscriber loop, the method comprising the steps of:
a) transmitting a stutter dial tone SDT signal on the subscriber loop;
b) receiving the stutter dial tone signal from the subscriber loop;
c) generating a signal envelope of the stutter dial tone signal;
d) generating a threshold parameter value from the signal envelope;
e) counting the number of threshold parameter crossings undertaken by the signal envelope; and
f) producing a signal indicating the SDT signal has been received when the number of threshold crossings exceeds a predefined value.

In accordance with another aspect of the invention, there is provided an apparatus for detecting a stutter dial tone SDT signal. The apparatus includes a receiver for receiving a signal envelope from subscriber loop, a detector for generating a signal envelope of the received signal, a threshold parameter generator for generating a threshold parameter value from the signal envelope, a counter for counting the number of threshold parameter crossings undertaken by the signal envelope and an SDT signal generator for generating a signal indicating the SDT signal has been received when the number of threshold crossings exceeds a predefined value.

Preferably, generator includes a sampler for taking samples of the signal envelope.

Preferably, the apparatus includes a processor for determining maximum and minimum values of at least some of the samples.

Preferably, the processor is programmed to generate the threshold parameter value as the scaled sum of the minimum and maximum values.

Preferably, the processor is programmed to determine whether or not a difference between the maximum value and the minimum value exceeds a predefined value.

Preferably, the processor is programmed to direct the sampler to take the samples while the difference is less than a predefined value.

Preferably, the processor is programmed to generate the threshold parameter value as the scaled sum of the minimum and maximum values.

Preferably, the apparatus includes a processor programmed to determine whether or not the signal envelope crosses the predefined threshold in a first direction or a second direction opposite to the first direction.

Preferably, the processor is programmed to record the times at which each crossing occurs.

Preferably, the processor is programmed to determine the time elapsed between successive crossings.

Preferably, the processor is programmed to determine whether or not the time elapsed exceeds a predefined value.

Preferably, the processor is programmed to increase the predefined value when the time elapsed exceeds the predefined value.

Preferably, the processor is programmed to determine the maximum time between successive threshold crossings in at least one of the directions, the maximum time representing a maximum pulse width.

Preferably, the processor is programmed to determine the number of maximum width pulses which can occur in a predefined sampling duration.

Preferably, the processor is programmed to take the quotient of a predefined sampling duration and the maximum pulse width.

Preferably, the processor is programmed to produce the signal indicating the SDT signal has been received when the number of threshold crossings exceeds the quotient.

In accordance with another aspect of the invention, there is provided a system for signalling a telephone in communication with a subscriber loop. The system includes a transmitter for transmitting a stutter dial tone SDT signal on the subscriber loop, a receiver at the telephone for receiving the stutter dial tone signal at the telephone, a detector for detecting a signal envelope of the stutter dial tone signal, a threshold parameter signal generator for generating a threshold parameter value from the signal envelope, a counter for counting the number of threshold parameter crossings undertaken by the signal envelope, and an SDT signal generator for generating a signal indicating the SDT signal has been received when the number of threshold crossings exceeds a predefined value.

In accordance with another aspect of the invention, there is provided an apparatus for detecting a stutter dial tone SDT signal. The apparatus includes a device for receiving a received signal from the subscriber loop, a device for generating a signal envelope from the received signal, a device means for generating a threshold parameter value from the signal envelope, a device for counting the number of threshold parameter crossings undertaken by the signal envelope and a device for producing a signal indicating the SDT signal has been received when the number of threshold crossings exceeds a predefined value.

In accordance with another aspect of the invention, there is provided a system for signalling a telephone in communication with a subscriber loop. The system includes a device for transmitting a stutter dial tone SDT signal on the subscriber loop, a device for receiving the stutter dial tone signal from the subscriber loop, a device for generating a signal envelope from the stutter dial tone signal, a device for generating a threshold parameter value from the signal envelope, a device for counting the number of threshold parameter crossings undertaken by the signal envelope, and a device for producing a signal indicating the SDT signal has been received when the number of threshold crossings exceeds a predefined value.

BRIEF DESCRIPTION OF THE DRAWINGS

In drawings which illustrate embodiments of the invention.

DETAILED DESCRIPTION

FIG. 1

Figure 1:
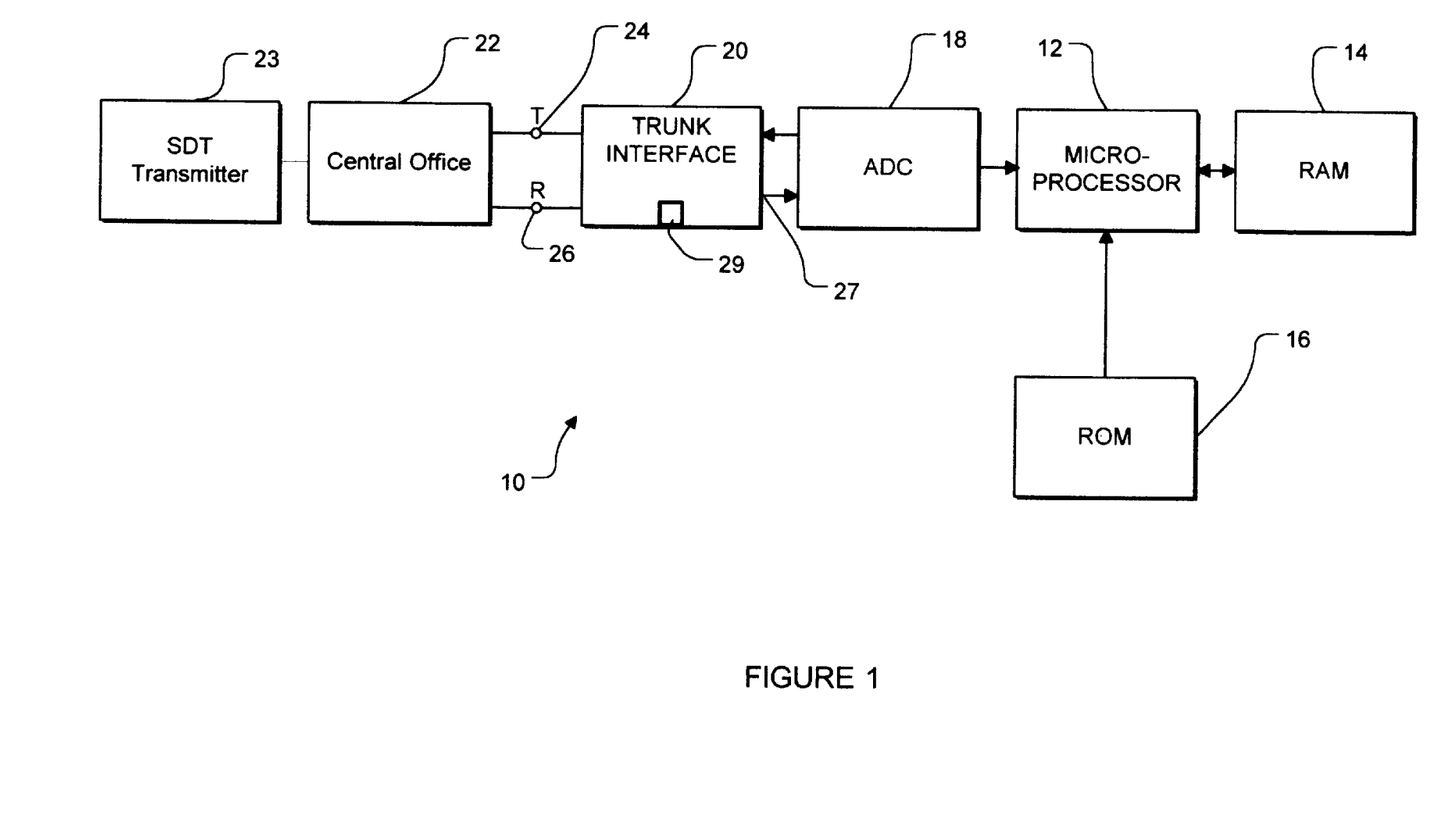
FIG. 1 is a block diagram of a system for signalling a telephone and an apparatus for adaptively detecting a stutter dial tone (SDT) signal according to a first embodiment of the invention.

Referring to FIG. 1, a system for signalling a telephone and an apparatus for adaptively detecting a stutter dial tone (SDT) signal, according to a first embodiment of the invention, is illustrated generally at 10. The system includes a central office 22 having an SDT transmitter 23 in communication with a telephone apparatus 11 through a subscriber loop 13.

The telephone apparatus includes a processor 12 having memory including Random Access Memory (RAM) 14 and Read Only Memory (ROM) 16, all connected to be controlled by and to exchange data with the processor 12. The processor 12 has conventional address and data buses (not shown).

The processor 12 is connected to control and receive data from an 8-bit analog to digital converter (ADC) 18. The ADC 18 is connected to a conventional trunk interface circuit 20 such as a Motorola(r) MC34010 integrated circuit which is connected to the telephone central office 22 through a local tip terminal 24 and a local ring terminal 26.

The trunk interface 20 includes a detector 29 having an signal envelope output 27 which acts as means for generating a signal envelope in response to signals received at the tip and ring terminals 24 and 26 to the subscriber loop. The ADC 18 is therefore connected to act as a receiver which acts as means for receiving the signal envelope in an analog form, including any DC offset. The ADC produces an 8-bit digital representation of the signal envelope.

FIG. 2

Figure 2:
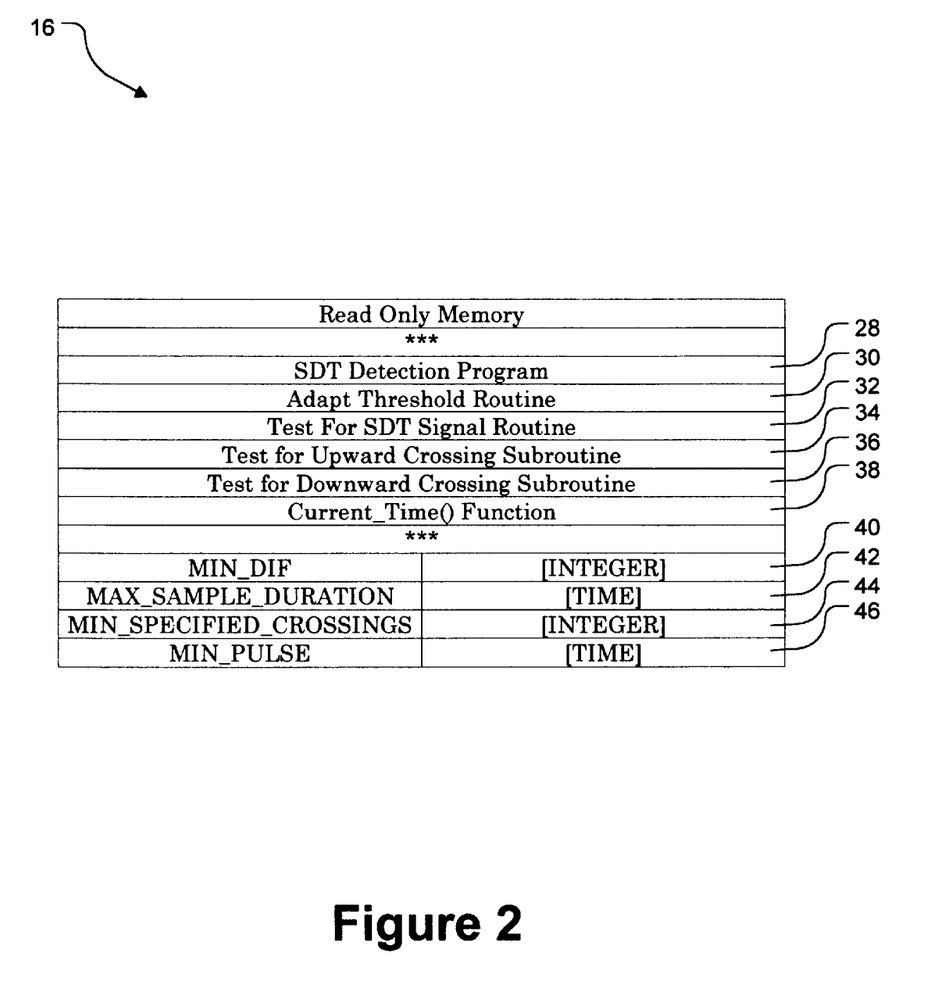
FIG. 2 is a block diagram of the structure of a Read Only Memory (ROM) of the apparatus of FIG. 1.

Referring to FIG. 2, the ROM 16 is programmed with codes representing instructions which direct the processor 12 to perform various functions, including functions implementing an SDT Detection Program 28, an Adapt Threshold Routine 30, a Test for SDT Signal Routine 32, a Test for Upward Crossing Subroutine 34, a Test for Downward Crossing Subroutine 36, and a Current_Time( ) Routine 38 which is an unspecified and conventional function not part of the invention that returns the current value of the processor 12 system clock.

The ROM 16 also stores a plurality of constant values that are referenced by the encoded routines, and subroutines, including: a MIN_DIF constant 40 representing the minimum valid difference between the amplitude extrema of an SDT signal envelope, a MAX_SAMPLING_DURATION constant 42 representing the ANSI specified maximum duration over which to sample a signal to determine if it is an SDT signal, a MIN_SPECIFIED_CROSSINGS constant 44 representing a minimum number of threshold crossings that a valid SDT signal will generate over the maximum sampling duration (the MAX_SAMPLING_DURATION constant 42), and a MIN_PULSE constant 46 representing the minimum width of each of the high and low levels of a pulse in a valid ANSI SDT signal.

FIG. 3

Figure 3:
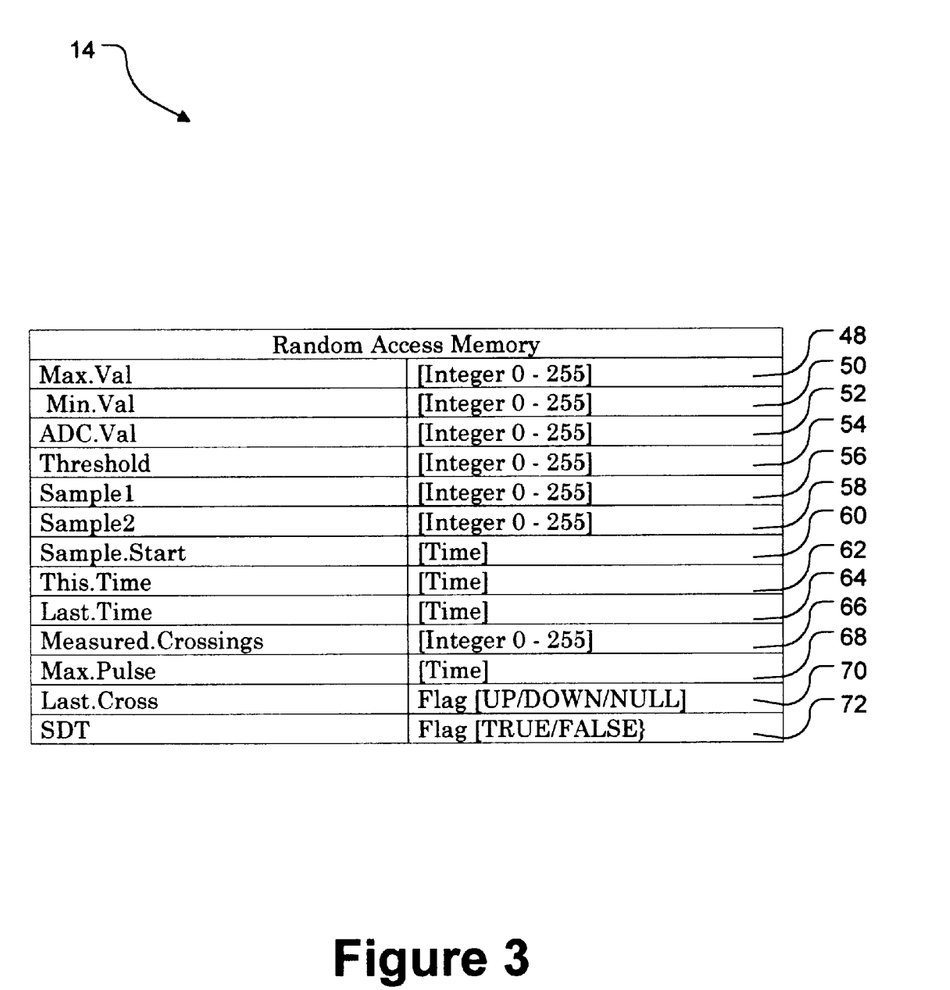
FIG. 3 is a block diagram of the structure of a Random Access Memory (RAM) of the apparatus of FIG. 1.

Referring to FIG. 3, the structure of the Random Access Memory (RAM) 14 will now be described. The RAM 16 is partitioned by the processor 12 to include a plurality of temporary data storage buffers for storing values used by the routines and subroutines encoded in the ROM 16. These buffers include a Max.Val buffer 48 for storing an integer representing a maximum measured amplitude value of a sampled signal envelope, a Min.Val 50 buffer for storing an integer representing a minimum measured amplitude value of a sampled signal envelope, an ADC.Val buffer 52 for storing an integer representing a most recently strobed digital word provided by the ADC 18, a Threshold buffer 54 for storing integer representing one-half the sum of the values stored in the Max.Val buffer 48 and the Min.Val 50 buffer, a Sample1 buffer 56 for storing an integer representing the value of the ADC.Val buffer 52 stored at a first time, a Sample2 buffer 58 for storing an integer representing the value of the ADC.Val buffer 52 stored at a second time later than the first time, a SampleStart buffer 60 for storing a time value representing the time at which an actual SDT signal testing session commenced, a This.Time buffer 62 for storing a time value representing the time at which the second sample stored in the Sample2 buffer 58 was measured, a Last.Time buffer 64 for storing a time value representing the time at which the last valid threshold crossing sample was measured, a Measured.Crossings buffer 66 for storing an integer representing the number of validated threshold crossing samples measured, a Max.Pulse 68 buffer for storing time value representing the width of the longest pulse (either high or low) measured, a Last.Cross 70 buffer representing a flag indicating the direction of the most recent threshold crossing measured and having a value being a member of the set {UP, DOWN, NULL}, and an SDT 72 buffer for storing a value representing a flag indicating whether an SDT signal has been detected and having a value being a member of the set {TRUE, FALSE}.

Operation

FIG. 4

SDT Detection Program

Figure 4:
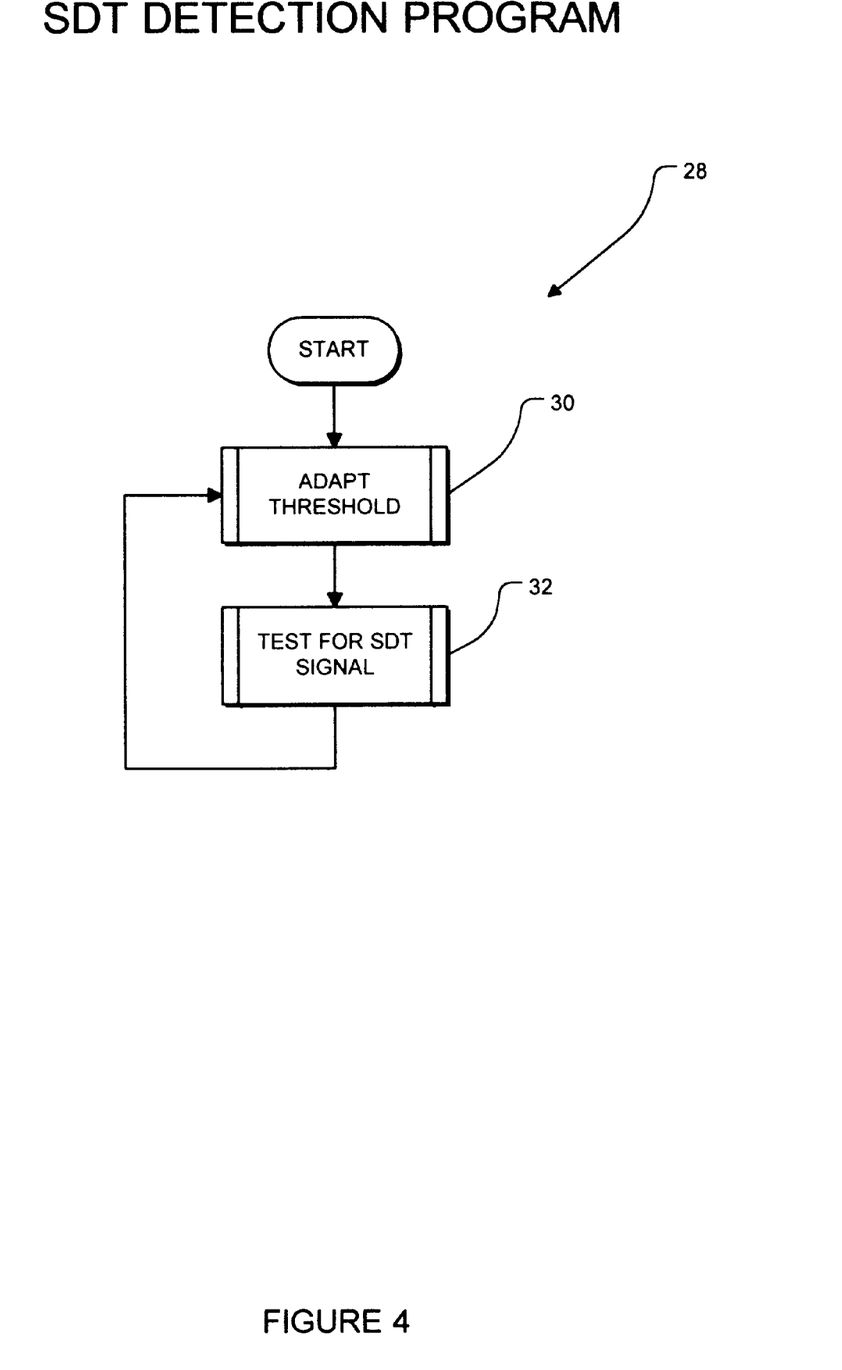
FIG. 4 is a flowchart of an SDT Detection Program encoded in the ROM of FIG. 2.

Referring to FIG. 4, the SDT Detection Program 28 includes a first step in which it directs the microprocessor to calibrate a threshold for the particular telephone line and signal being tested, the threshold being the boundary between a high state and low state of a signal. In a second step of the program, the microprocessor is directed to sample the signal for a predefined duration, count threshold crossings and measure pulse widths to determine whether the signal is an SDT signal. The first step is accomplished by the Adapt Threshold routine 30 and the second step is accomplished by the Test For SDT Signal routine 32. These two routines are continuously repeated. When an SDT signal is detected, an SDT detect signal is produced, the routines thereby providing an SDT detect signal generator.

FIG. 5

Adapt Threshold Routine

Figure 5:
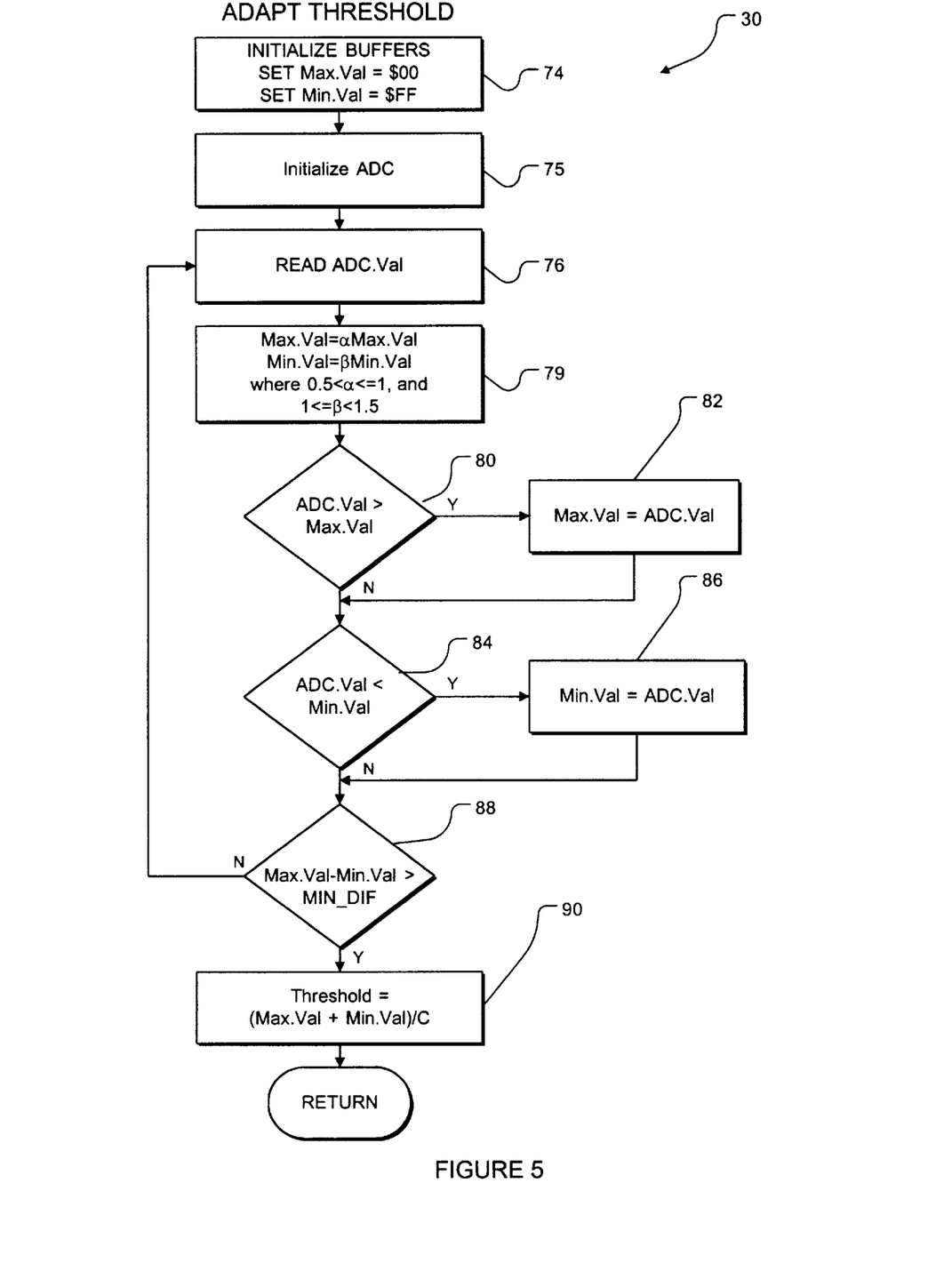
FIG. 5 is a flowchart of an Adapt Threshold Routine encoded in the ROM of FIG. 2.

The Adapt Threshold Routine 30 calibrates the threshold level defining an on-state and an off-state of a signal. This threshold level will vary with the signal and line conditions being monitored. The routine involves searching for the amplitude extrema of the signal envelope until extreme values have been found that differ by at least a minimum expected amount. When that difference has been determined, the threshold level is set to be the average of the amplitude extrema, that is, maximum and minimum points of the signal envelope.

The routine begins with block 74 which directs the processor 12 to initialize the Max.Val buffer 48 to $00 and Min.Val buffer 50 to $FF. These initial values are clearly invalid but are chosen to prevent premature convergence to incorrect values. Block 75 then directs the processor to initialize the Analog to Digital converter. This is done by signalling the analog to digital converter to start converting and then discarding samples produced during the first 0.5 seconds of conversion. Block 76 then directs the processor 12 to read the word being currently output from the ADC 18 and to store that word in the ADC.Val buffer 52. Thus, the ADC 18 acts as a sampler, or means for taking samples of the signal envelope.

Block 79 then directs the processor to adjust the contents of the Max.Val buffer 48 by a scale factor, alpha and to adjust the contents of the Min.Val buffer 46 by a scale factor, beta. The scale factor alpha is in the range of between approximately 0.5 and approximately 1 whereas the scale factor beta is in the range of between approximately 1 and approximately 1.5.

Block 80 directs the processor 12 to determine whether the value stored in the ADC.Val buffer 52 is greater than the value stored in the Max.Val buffer 48. If so, then a new maximum envelope point has been detected and block 82 directs the processor 12 to store the value stored in the ADC.Val 52 buffer into the Max.Val buffer 48 and the processor 12 is directed to block 84.

Alternatively, if the value stored in the ADC.Val buffer 52 is not greater than the value stored in the Max.Val buffer 48, then the processor 12 is directed to block 84.

Block 84 directs the processor 12 to determine whether the value stored in the ADC.Val buffer 52 is less than the value stored in the Min.Val buffer 50. If so, then a new minimum envelope point has been detected and block 86 directs the processor 12 to store the value stored in the ADC.Val buffer 52 into the Min.Val buffer 50 and the processor 12 is directed to block 88.

Alternatively, if the value stored in the ADC.Val buffer 52 is not less than the value stored in the Min.Val buffer 50, then the processor 12 is directed to block 88. Effectively, blocks 80–86 load the Max.Val and Min.Val buffers 48 and 50 with minimum and maximum values of the signal envelope. Thus, the processor acts as means for determining maximum and minimum values of at least some of the samples.

Block 88 directs the processor 12 to determine whether the value stored in the Max.Val buffer 48 is greater than the value stored in the Min.Val buffer 50 by at least as much as the MIN_DIF constant 40. Thus, the processor is programmed to act as means for determining whether or not a difference between the maximum value and the minimum value exceeds a predefined value. It will be noted that the first time through this loop the values in the Max.Val buffer 48 and the Min.Val buffer 50 will be identical, being the value in the ADC.Val buffer 52. In subsequent iterations, the values stored in the Max.Val buffer 48 and Min.Val buffer 50 will diverge from each other and converge toward the extreme points of the envelope of the currently measured signal.

Therefore, if the condition evaluated at block 88 is false, then the processor 12 is directed back to block 76 to resample the digital word output from the ADC 18 and to store it in the ADC.Val buffer 52. Thus, the processor is programmed to act as means for directing the sampler to take samples while the difference is less than a predefined value. Alternatively, if the condition tested at block 88 is true, then block 90 directs the processor 12 to calculate a scaled sum of the values stored in the Max.Val buffer 48 and the Min.Val buffer 50 and to store this scaled sum in the Threshold buffer 54. In this embodiment, the scaled sum is an average value, i.e. the constant C=2. Thus, the processor is programmed to act as means for generating threshold parameter values as the scaled sum of the minimum and maximum values. The value stored in the Threshold buffer 54 is the calibrated boundary between the pulse on- and off-states of the currently monitored signal on the current telephone line. The adapt threshold routine is thus completed and the first step of the SDT detection program is completed. This routine then is a Threshold Parameter Generator which acts as means for generating a Threshold Parameter from the signal envelope, this Threshold Parameter being the value stored in the threshold buffer.

FIG. 6
Test for SDT Signal Routine

Figure 6A:
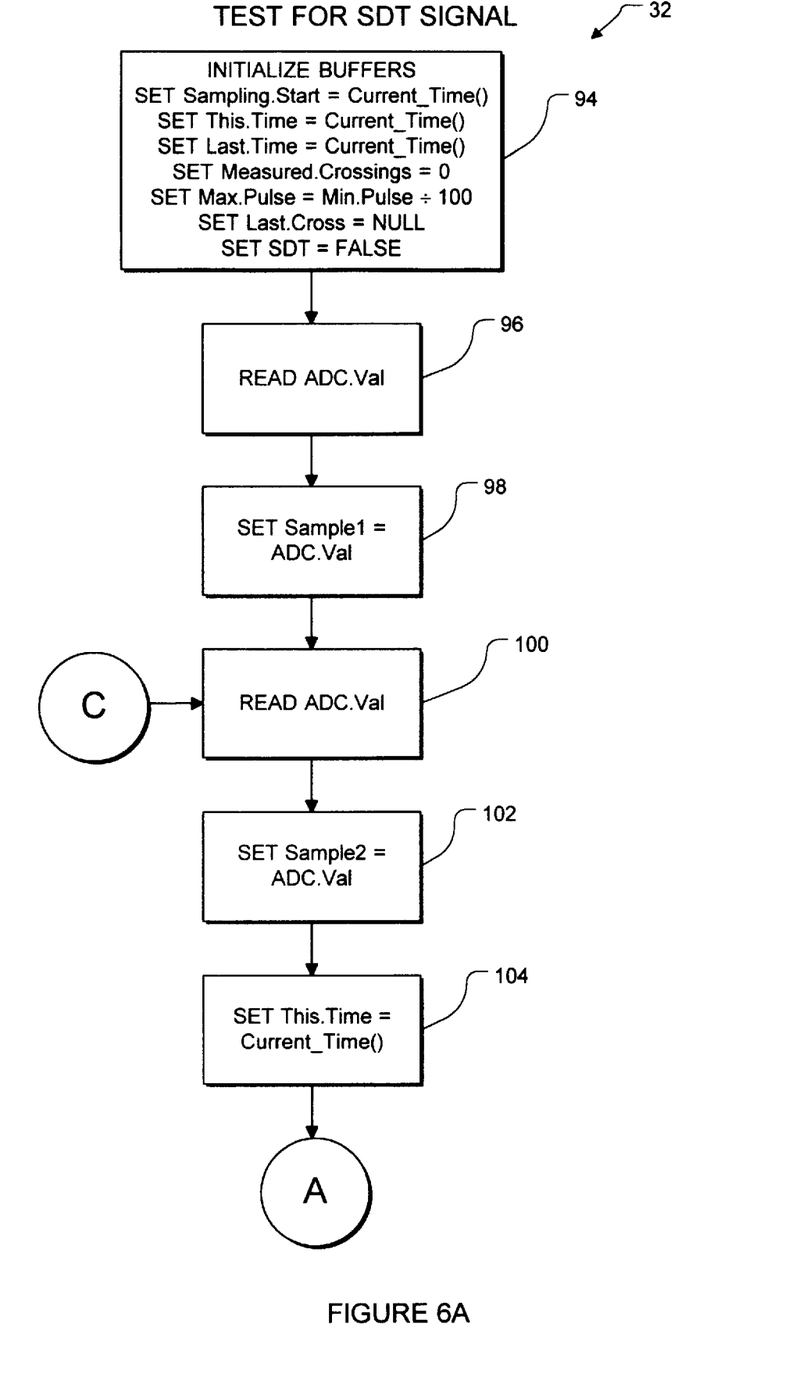
FIGS. 6A, B, C illustrate a block diagram of a Test for SDT Signal Routine encoded in the ROM of FIG. 2.
Figure 6B:
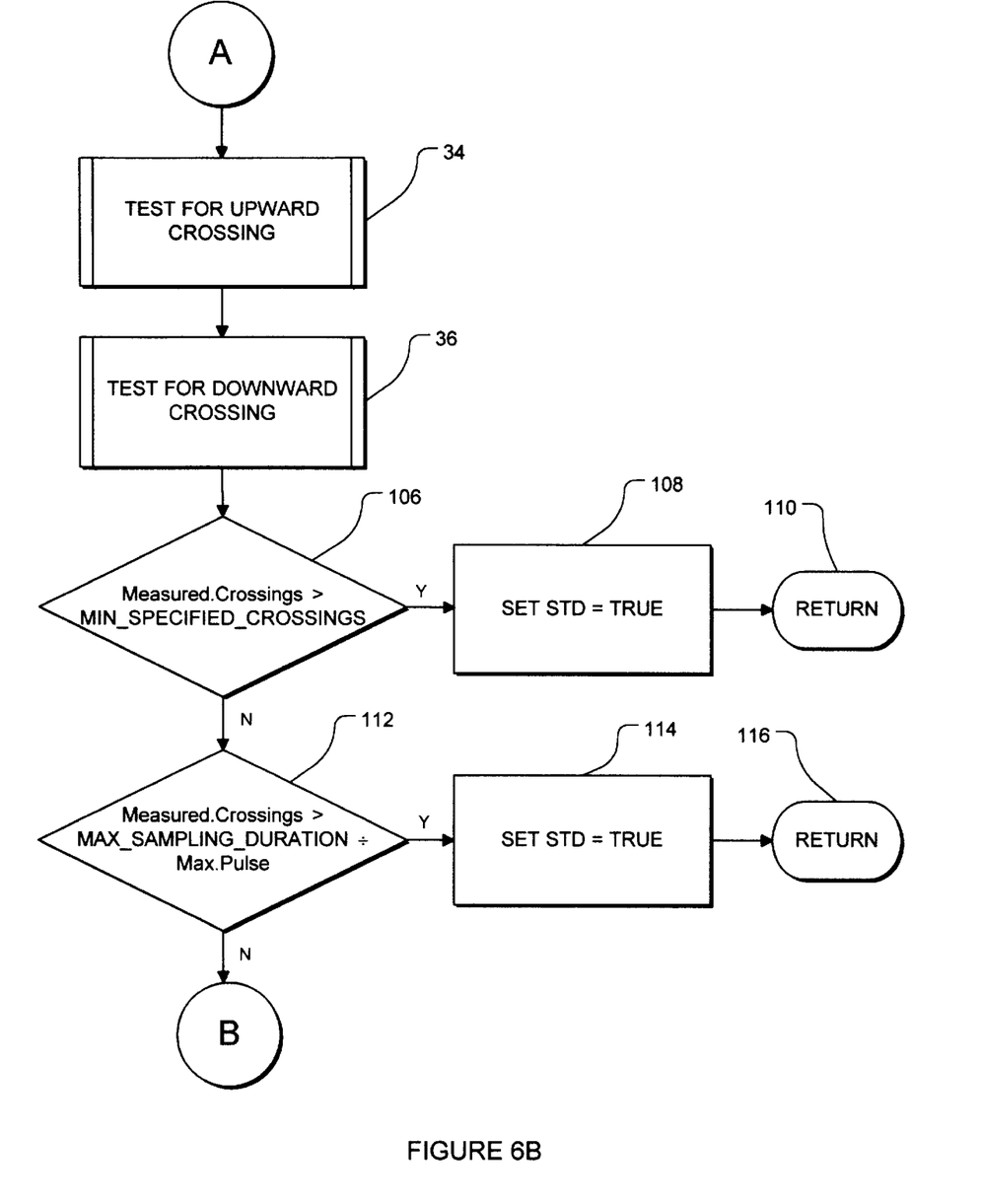
Figure 6C:
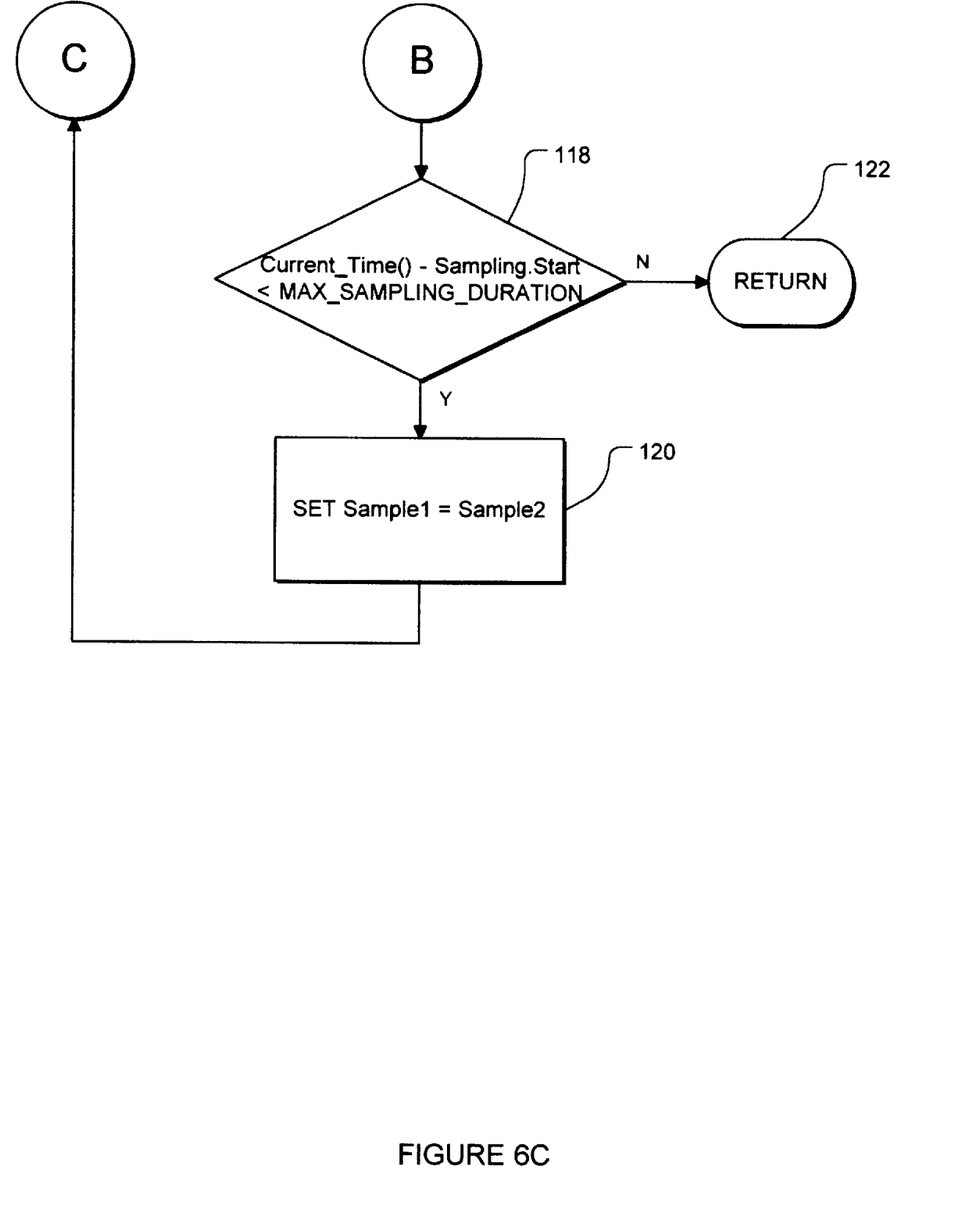

Referring to FIGS. 6A, 6B and 6C, the Test for SDT Signal Routine 32 directs the processor to compare the signal being monitored to the threshold previously calculated in the Adapt Threshold Routine 30 and stored in the Threshold buffer 54. The Test for SDT Signal Routine 32 directs the processor to take a series of samples of the signal being tested, searching for pairs of adjacent samples on opposite sides of the threshold. It then uses these threshold crossings to estimate both the frequency and the pulse widths of the signal being tested to determine if the signal has the properties of an SDT signal.

The Test for SDT Signal Routine begins with block 94 which directs the processor 12 to initialize the Sampling.Start buffer 60, the This.Time buffer 62, and the Last.Time buffer 64 with a time value provided by the Current_Time( ) function 38. In addition, the Measured.Crossings buffer 66 is initialized to the value 0, the Max.Pulse buffer 68 is initialized to a value that is less than and small relative to the MIN_PULSE constant 46, the Last.Cross buffer 70 is initialized to the value NULL, and the SDT 72 buffer is initialized to the value FALSE.

Block 96 directs the processor 12 to read the current word being output from the ADC 18 and to store that value in the ADC.val buffer 52. Block 98 then directs the processor 12 to store the value stored in ADC.val buffer 52 into the Sample1 buffer 56. In this way, the test signal is sampled at a first time $t_1$.

Block 100 directs the processor 12 to read the current word being output from the ADC 18 and to store that value in the ADC.val buffer 52. Block 102 directs the processor 12 to store the value stored in ADC.val buffer 52 into the Sample2 buffer 58. In this way, the test signal is sampled at a second time $t_2$ later than the first time $t_1$. Block 104 then directs the processor 12 to store in the This.Time buffer 62 a current time value provided by the Current_Time( ) function to mark the time that the second signal sample was measured and read into the Sample2 buffer 58.

Figure 7:
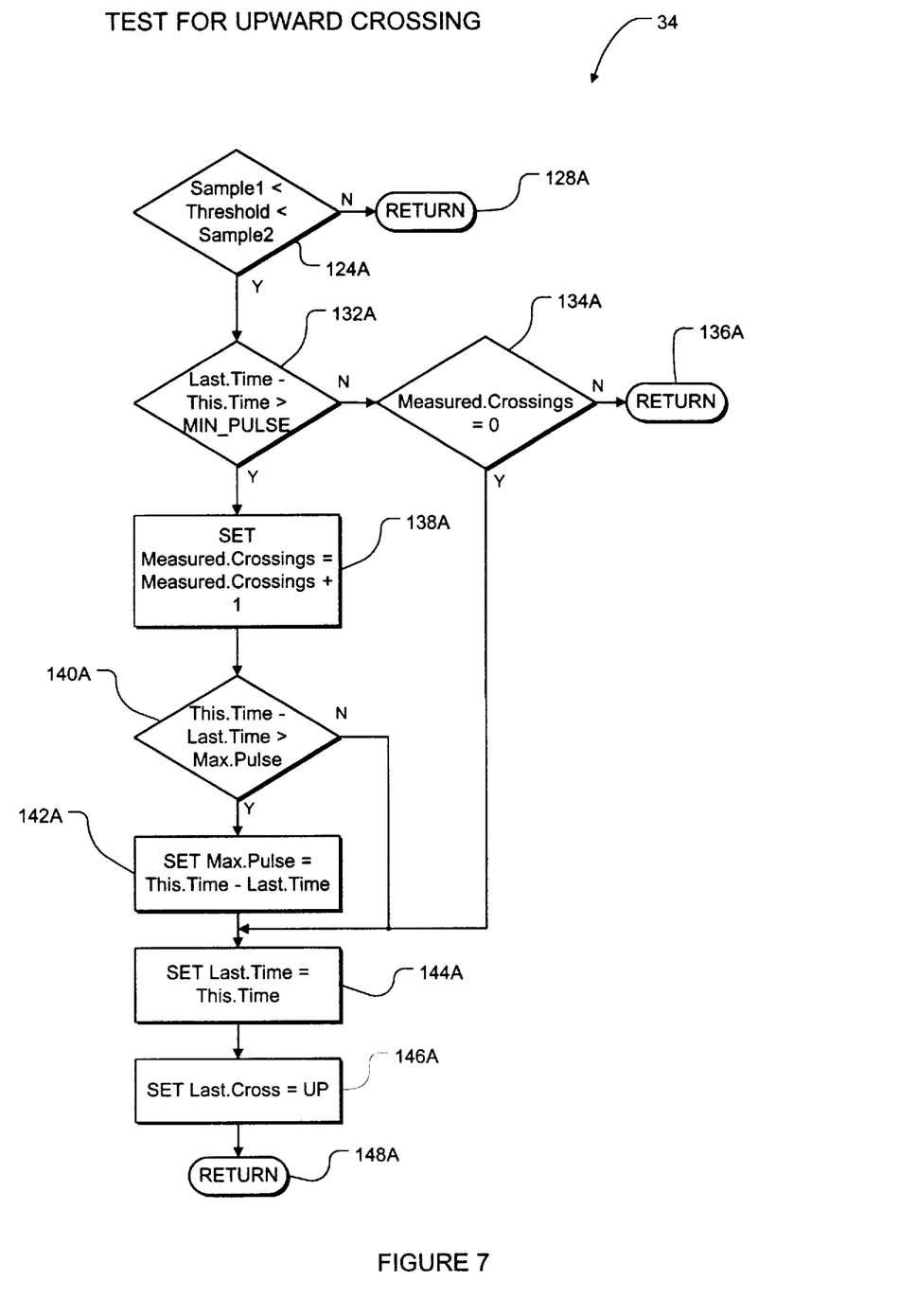
FIG. 7 is a block diagram of a Test for Upward Crossing Subroutine encoded in the ROM of FIG. 2.

Referring to FIG. 6B, block 34 directs the microprocessor to execute the Test for Upward Crossing Routine shown in FIG. 7.

FIG. 7
Test for Upward Crossing Subroutine

Referring to FIG. 7, the Test for Upward Crossing Subroutine 34 begins with block 124A which directs the processor 12 to determine if the value stored in the Sample1 buffer 56 is less than the value stored in the Threshold buffer 54 and at the same time the value stored in the Threshold buffer 54 is less than the value stored in the Sample2 buffer 58. If both conditions are met, then the monitored signal has upwardly crossed the threshold and the processor 12 is directed to block 132A which directs the processor 12 to determine if the value stored in the Last.Time buffer 64 minus the value stored in the This.Time buffer 62 is greater than the MIN_PULSE constant 46. If the pulse width measured by this test is less than the MIN_PULSE constant 46, then the threshold crossing is too close to the previous one to be a component of a ANSI specified SDT signal. In that case, block 134A directs the processor 12 to determine whether a special case exists, wherein the value in the Measured.Crossings buffer 66 is equal to 0, thus indicating that the first threshold crossing is still being sought and therefore no pulse width can actually be measured. In that case, then the processor 12 is directed to block 144A to establish the first threshold crossing. Alternatively, if the value stored in the Measured.Crossings buffer 66 is not equal to 0, then block 136A directs the processor 12 back to the Test for SDT Signal Routine 32, having not detected a valid upward threshold crossing.

Alternatively, if at block 132A the Last.Time buffer 64 minus the value stored in the This.Time buffer 62 is greater than the MIN_PULSE constant 46, then a valid upward threshold crossing has been detected.

Thereafter, block 138A directs the processor 12 to increment the value stored in the Measured.Crossings buffer 66 to account for the newly detected valid upward threshold crossing. Block 140A then directs the processor 12 to determine if the value stored in the This.Time buffer 62 minus the value stored in the Last.Time buffer 64 is greater than the value stored in the Max.Pulse buffer 68. If so, then a new longest pulse has been detected and block 142A directs the processor 12 to store the new pulse width in the Max.Pulse buffer 68 and the processor 12 is directed to block 144A.

Alternatively, if the value stored in the This.Time buffer 62 minus the value stored in the Last.Time buffer 64 is not greater than the value stored in the Max.Pulse buffer 68, then the processor 12 is directed to block 144A.

Block 144A directs the processor 12 to store the value currently stored in the This.Time buffer 62 into the Last.Time buffer 64 to advance the sampling time scale in preparation for measuring a new sample. Block 146A then directs the processor 12 to set the Last.Cross buffer 70 to UP to indicate that the most recent valid threshold crossing has been upward, and block 148A directs the processor 12 to return to the Test for SDT Signal Routine 32 shown in FIG. 6B.

Figure 8:
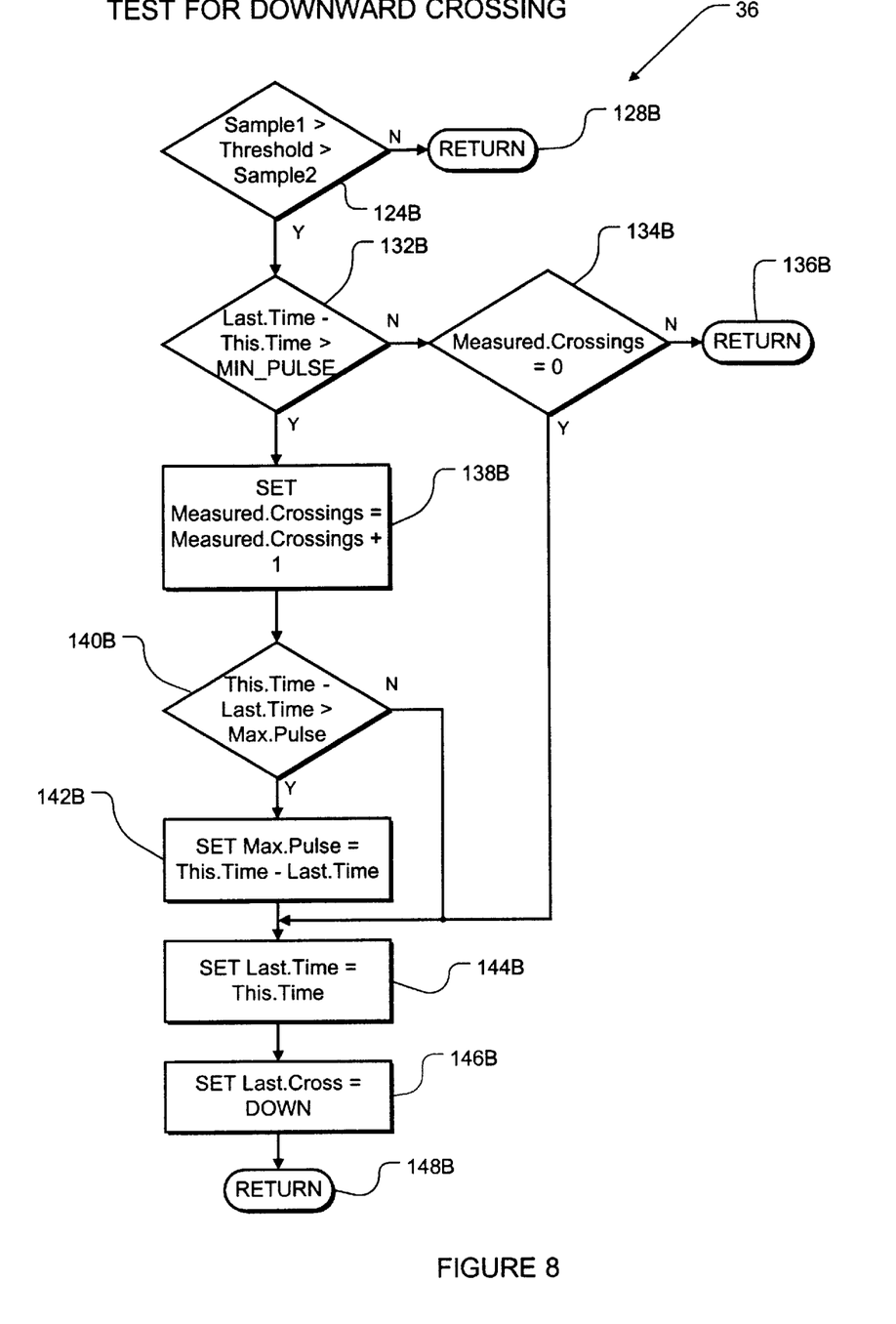
FIG. 8 is a block diagram of a Test for Downward Crossing Subroutine encoded in the ROM of FIG. 2.

Referring to FIG. 6B when the Test for Upward Crossing Routine is completed, the microprocessor is directed to the Test for Downward Crossing Subroutine shown at 36 in FIG. 8.

FIG. 8

Test for Downward Crossing Subroutine

Referring to FIG. 8, the Test for Downward Crossing Subroutine 36 begins with block 124B which directs the processor 12 to determine if the value stored in the Sample1 buffer 56 is greater than the value stored in the Threshold buffer 54 and at the same time the value stored in the Threshold buffer 54 is greater than the value stored in the Sample2 buffer 58. If both conditions are met, then the monitored signal has downwardly crossed the threshold and the processor 12 is directed to 132B which directs the processor 12 to determine if the value stored in the Last.Time buffer 64 minus the value stored in the This.Time buffer 62 is greater than the MIN_PULSE constant 46. If the pulse width measured by this test is less than the MIN_PULSE constant 46, then the threshold crossing is too close to the previous one to be a component of a ANSI specified SDT signal. In that case, block 134B directs the processor 12 to determine whether a special case exists, wherein the value in the Measured.Crossings buffer 66 is equal to 0, thus indicating that the first threshold crossing is still being sought and therefore no pulse width can actually be measured. In that case, the processor 12 is directed to block 144B to establish the first threshold crossing. Alternatively, if the value stored in the Measured.Crossings buffer 66 is not equal to 0, then block 136B directs the processor 12 back to the Test for SDT Signal Routine 32, having not detected a valid downward threshold crossing.

Alternatively, if at block 132B the Last.Time buffer 64 minus the value stored in the This.Time buffer 62 is greater than the MIN_PULSE constant 46, then a valid downward threshold crossing has been detected.

Block 132A and 132B thereby program the processor to act as means for determining the time elapsed between successive crossings, and to act as means for determining whether or not the time elapsed exceeds a predefined value which in this embodiment is MIN_PULSE.

Thereafter, block 138B directs the processor 12 to increment the value stored in the Measured.Crossings buffer 66 to account for the newly detected valid downward threshold crossing. Block 140B then directs the processor 12 to determine if the value stored in the This.Time buffer 62 minus the value stored in the Last.Time buffer 64 is greater than the value stored in the Max.Pulse buffer 68. If so, then a new longest pulse has been detected and block 142B directs the processor 12 to store the new pulse width in the Max.Pulse buffer 68 and the processor 12 is directed to block 144B. Blocks 140A and 140B thereby program the microprocessor to act as means for increasing the predefined value MAX_PULSE buffer when the time elapsed since the last pulse crossing was detected exceeds the predefined value in the MAX_PULSE buffer, and to act as means for determining the maximum time between successive threshold crossings in at least one of the directions, the maximum time representing a maximum pulse width.

Alternatively, if the value stored in the This.Time buffer 62 minus the value stored in the Last.Time buffer 64 is not greater than the value stored in the Max.Pulse buffer 68, then the processor 12 is directed to block 144B.

Block 144B directs the processor 12 to store the value currently stored in the This.Time buffer 62 into the Last.Time buffer 64 to advance the sampling time scale in preparation for measuring a new sample. Block 146B then directs the processor 12 to set the Last.Cross buffer 70 to DOWN to indicate that the most recent valid threshold crossing has been downward, and block 148A directs the processor 12 to return to the Test for SDT Signal Routine 32 shown in FIG. 6B.

Block 144A and 144B thus program the microprocessor to act as means for recording the times at which each crossing occurs.

Referring to FIG. 6B, effectively, the test for upward crossing subroutine 34 and the test for downward crossing subroutine detect and validate upward and downward threshold crossings. Thus, the processor is programmed to act as means for determining whether or not the signal envelope crosses the predefined threshold in a first direction or a second direction opposite to the first direction. With each valid threshold crossing detected, the processor 12 is directed to increment the value stored in the Measured.Crossings buffer 66, a counter which acts as means for counting the number of threshold parameter crossings undertaken by the signal envelope. Within these same two routines 34, 36, the processor 12 is also directed to search for the longest duration pulse, either high or low, and to store that duration in the Max.Pulse buffer 68.

Upon returning from the Test for Upward Crossing Subroutine 34 and the Test for Downward Crossing Subroutine 36, block 106 directs the processor 12 to determine whether the value stored in the Measured.Crossings buffer 66 is greater than the value of the MIN_SPECIFIED_CROSSINGS constant 44. If so, then an SDT signal has been detected and block 108 directs the processor 12 to set the contents of the SDT buffer 72 to TRUE, thus implementing an SDT detect signal generator which acts as means for generating a signal indicating the SDT signal has been received when the number of threshold crossings exceeds a predefined value. Thereafter block 110 directs the processor 12 to return to the SDT Detection Program 28 shown in FIG. 4.

Referring to FIG. 6B, alternatively, if the value stored in the Measured.Crossings buffer 66 is not greater than the MIN_SPECIFIED_CROSSINGS constant 44, then the processor 12 is directed to block 112. Block 112 directs the processor 12 to determine whether the value stored in the Measured.Crossings buffer 66 is greater than the MAX_SAMPLING_DURATION constant 42 divided by the value stored in the Max.Pulse buffer. Thus, the processor is programmed to act as means for determining the number of maximum width pulses which can occur in a predefined sampling duration. This test is essentially a second chance to detect an SDT signal with an unusually long pulse width and is predicated on the assumption that such an SDT signal can be recognized if the number of threshold crossings detected is no less than the sampling period divided by the maximum pulse width. Thus, the processor is programmed to act as means for taking the quotient of a predefined sampling duration and the maximum pulse width. If the conditions tested at block 112 are satisfied, then an SDT signal has been detected and block 114 directs the processor 12 to set the contents of the SDT buffer 72 to TRUE. Thus, the processor is programmed to act as means for producing the signal indicating the SDT signal has been received when the number of threshold crossings exceeds the quotient. Block 116 then directs the processor 12 to return to the SDT Detection Program 28 shown in FIG. 4.

Referring to FIGS. 6B and 6C, alternatively, if the value stored in the Measured.Crossings buffer 66 is not greater than the MAX_SAMPLING_DURATION constant 42 divided by the value stored in the Max.Pulse buffer, then block 118 of FIG. 6C directs the processor 12 to determine whether the current time as provided by the Current_Time( ) function 38, minus the value stored in the Sampling.Start buffer 60 is less than the value of the MAX_SAMPLING_DURATION constant 42. If so, then block 120 directs the processor 12 to discard the value stored in the Sample1 buffer 56 and to store the value stored in the Sample2 buffer 58 into the Sample1 buffer 56. Thereafter, the processor 12 is directed to loop back to block 100 of FIG. 6A to read a new sample from the ADC 18 into the Sample2 buffer 58.

Alternatively, if the current time, as provided by the Current_Time( ) function 38, minus the value stored in the Sampling.Start buffer 60 is not less than the value of the MAX_SAMPLING_DURATION constant 42, then block 122 directs the processor 12 to return to the SDT Detection Program 28, having not found an SDT signal.

Therefore it can be seen that by calculating and calibrating to a scaled sum of the extrema of the received signal, the ability to detect threshold crossings in the monitored signal is improved. By selectively reducing the number of pulse edges required to detect an SDT signal, one can increase the chance of detecting non-standard SDT signals such as SDT signals provided by extra long pulses.

While specific embodiments of the invention have been described and illustrated, such embodiments should be considered illustrative of the invention only and not as limiting the invention as construed in accordance with the accompanying claims.

What is claimed is:

1. A method of detecting a stutter dial tone SDT signal, the method comprising the steps of:
    a) receiving a received signal from a subscriber loop;
    b) generating a signal envelope of said received signal;
    c) generating a threshold parameter value from said signal envelope;
    c) counting the number of threshold parameter crossings undertaken by said signal envelope; and
    d) producing a signal indicating said SDT signal has been received when said number of threshold crossings exceeds a predefined value.

2. A method as claimed in claim 1 wherein the step of generating a threshold parameter value includes the step of taking samples of said signal envelope.

3. A method as claimed in claim 2 further including the step of determining maximum and minimum values of at least some of said samples.

4. A method as claimed in claim 3 further including the step of generating said threshold parameter value as the scaled sum of said minimum and maximum values.

5. A method as claimed in claim 3 further including the step of determining whether or not a difference between said maximum value and said minimum value exceeds a predefined value.

6. A method as claimed in claim 5 further including the step of taking said samples while said difference is less than a predefined value.

7. A method as claimed in claim 6 further including the step of generating said threshold parameter value as the scaled sum of said minimum and maximum values.

8. A method as claimed in claim 1 further including the step of determining whether or not said signal envelope crosses said predefined threshold in a first direction or a second direction opposite to said first direction.

9. A method as claimed in claim 8 further including the step of recording the times at which each crossing occurs.

10. A method as claimed in claim 9 further including the step of determining the time elapsed between successive crossings.

11. A method as claimed in claim 10 further including the step of determining whether or not said time elapsed exceeds a predefined value.

12. A method as claimed in claim 11 further including the step of increasing said predefined value when said time elapsed exceeds said predefined value.

13. A method as claimed in claim 8 further including the step of determining the maximum time between successive threshold crossings in at least one of said directions, said maximum time representing a maximum pulse width.

14. A method as claimed in claim 13 further including the step of determining the number of maximum width pulses which can occur in a predefined sampling duration.

15. A method as claimed in claim 14 wherein the step of determining the number of maximum pulse width pulses includes the step of taking the quotient of a predefined sampling duration and said maximum pulse width.

16. A method as claimed in claim 15 further including the step of producing said signal indicating said SDT signal has been received when said number of threshold crossings exceeds said quotient.

17. A method of signalling a telephone in communication with a subscriber loop, the method comprising the steps of:
    a) transmitting a stutter dial tone SDT signal on said subscriber loop;
    b) receiving said stutter dial tone signal from said subscriber loop;
    c) generating a signal envelope of said stutter dial tone signal;
    d) generating a threshold parameter value from said signal envelope;
    e) counting the number of threshold parameter crossings undertaken by said signal envelope; and
    f) producing a signal indicating said SDT signal has been received when said number of threshold crossings exceeds a predefined value.

18. An apparatus for detecting a stutter dial tone SDT signal, the apparatus comprising:
    a) a receiver for receiving a signal envelope from subscriber loop;
    b) a detector for generating a signal envelope of said received signal;
    c) a threshold parameter generator for generating a threshold parameter value from said signal envelope;
    d) a counter for counting the number of threshold parameter crossings undertaken by said signal envelope; and
    e) an SDT detect signal generator for generating a signal indicating said SDT signal has been received when said number of threshold crossings exceeds a predefined value.

19. An apparatus as claimed in claim 18 wherein generator includes a sampler for taking samples of said signal envelope.

20. An apparatus as claimed in claim 19 further including a processor for determining maximum and minimum values of at least some of said samples.

21. An apparatus as claimed in claim 20 wherein said processor is programmed to generate said threshold parameter value as the scaled sum of said minimum and maximum values.

22. An apparatus as claimed in claim 20 wherein said processor is programmed to determine whether or not a difference between said maximum value and said minimum value exceeds a predefined value.

23. An apparatus as claimed in claim 22 wherein said processor is programmed to direct said sampler to take said samples while said difference is less than a predefined value.

24. An apparatus as claimed in claim 23 wherein said processor is programmed to generate said threshold parameter value as the scaled sum of said minimum and maximum values.

25. An apparatus as claimed in claim 18 further including a processor programmed to determine whether or not said signal envelope crosses said predefined threshold in a first direction or a second direction opposite to said first direction.

26. An apparatus as claimed in claim 25 wherein said processor is programmed to record the times at which each crossing occurs.

27. An apparatus as claimed in claim 26 wherein said processor is programmed to determine the time elapsed between successive crossings.

28. An apparatus as claimed in claim 27 wherein said processor is programmed to determine whether or not said time elapsed exceeds a predefined value.

29. An apparatus as claimed in claim 28 wherein said processor is programmed to increase said predefined value when said time elapsed exceeds said predefined value.

30. An apparatus as claimed in claim 25 wherein said processor is programmed to determine the maximum time between successive threshold crossings in at least one of said directions, said maximum time representing a maximum pulse width.

31. An apparatus as claimed in claim 30 wherein said processor is programmed to determine the number of maximum width pulses which can occur in a predefined sampling duration.

32. An apparatus as claimed in claim 31 wherein said processor is programmed to take the quotient of a predefined sampling duration and said maximum pulse width.

33. An apparatus as claimed in claim 32 wherein said processor is programmed to produce said signal indicating said SDT signal has been received when said number of threshold crossings exceeds said quotient.

34. A system for signalling a telephone in communication with a subscriber loop, the system comprising:
   a) a transmitter for transmitting a stutter dial tone SDT signal on said subscriber loop;
   b) a receiver at said telephone for receiving said stutter dial tone signal at said telephone;
   c) a detector for detecting a signal envelope of said stutter dial tone signal;
   d) a threshold parameter signal generator for generating a threshold parameter value from said signal envelope;
   e) a counter for counting the number of threshold parameter crossings undertaken by said signal envelope; and
   f) an SDT detect signal generator for generating a signal indicating said SDT signal has been received when said number of threshold crossings exceeds a predefined value.

35. An apparatus for detecting a stutter dial tone SDT signal, the apparatus comprising:
   a) means for receiving a received signal from said subscriber loop;
   b) means for generating a signal envelope from said received signal;
   c) means for generating a threshold parameter value from said signal envelope;
   d) means for counting the number of threshold parameter crossings undertaken by said signal envelope; and
   e) means for producing a signal indicating said SDT signal has been received when said number of threshold crossings exceeds a predefined value.

36. An apparatus as claimed in claim 35 wherein said means for receiving includes a receiver.

37. An apparatus as claimed in claim 35 wherein said means for generating, said means for counting and said means for producing includes a processor.

38. An apparatus as claimed in claim 35 wherein means for generating a threshold parameter value includes means for taking samples of said signal envelope.

39. An apparatus as claimed in claim 38 wherein said means for taking samples includes an analog to digital converter.

40. An apparatus as claimed in claim 38 further including means for determining maximum and minimum values of at least some of said samples.

41. An apparatus as claimed in claim 40 further including means for generating said threshold parameter value as the scaled sum of said minimum and maximum values.

42. An apparatus as claimed in claim 40 further including means for determining whether or not a difference between said maximum value and said minimum value exceeds a predefined value.

43. An apparatus as claimed in claim 42 further including means for taking said samples while said difference is less than a predefined value.

44. An apparatus as claimed in claim 43 further including means for generating said threshold parameter value as the scaled sum of said minimum and maximum values.

45. An apparatus as claimed in claim 35 further including means for determining whether or not said signal envelope crosses said predefined threshold in a first direction or a second direction opposite to said first direction.

46. An apparatus as claimed in claim 45 further including means for recording the times at which each crossing occurs.

47. An apparatus as claimed in claim 46 further including means for determining the time elapsed between successive crossings.

48. An apparatus as claimed in claim 47 further including means for determining whether or not said time elapsed exceeds a predefined value.

49. An apparatus as claimed in claim 48 further including means for increasing said predefined value when said time elapsed exceeds said predefined value.

50. An apparatus as claimed in claim 45 further including means for determining the maximum time between successive threshold crossings in at least one of said directions, said maximum time representing a maximum pulse width.

51. An apparatus as claimed in claim 50 further including means for determining the number of maximum width pulses which can occur in a predefined sampling duration.

52. An apparatus as claimed in claim 51 wherein means for determining the number of maximum pulse width pulses includes means for taking the quotient of a predefined sampling duration and said maximum pulse width.

53. An apparatus as claimed in claim 52 further including means for producing said signal indicating said SDT signal has been received when said number of threshold crossings exceeds said quotient.

54. A system for signalling a telephone in communication with a subscriber loop, the system comprising:
   a) means for transmitting a stutter dial tone SDT signal on said subscriber loop;
   b) means for receiving said stutter dial tone signal from said subscriber loop;
   b) means for generating a signal envelope from said stutter dial tone signal;
   c) means for generating a threshold parameter value from said signal envelope;
   d) means for counting the number of threshold parameter crossings undertaken by said signal envelope; and
   e) means for producing a signal indicating said SDT signal has been received when said number of threshold crossings exceeds a predefined value.

55. An apparatus as claimed in claim 54 wherein said means for receiving includes a receiver.

56. An apparatus as claimed in claim 54 wherein said means for generating, said means for counting and said means for producing includes a processor.

* * * * *